No. 614,699. Patented Nov. 22, 1898.
G. R. CLARKE.
FRICTION CLUTCH.
(Application filed Mar. 18, 1898.)
(No Model.)  2 Sheets—Sheet 1.
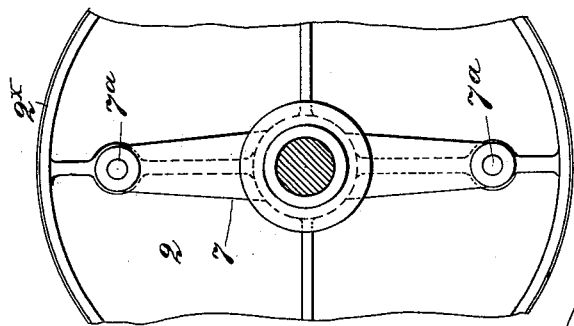
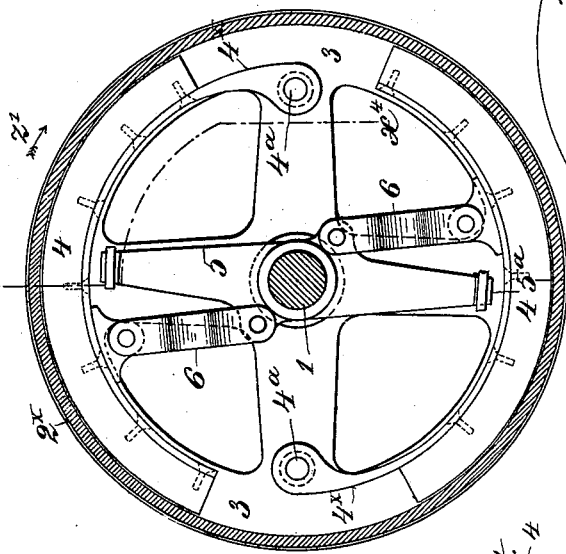
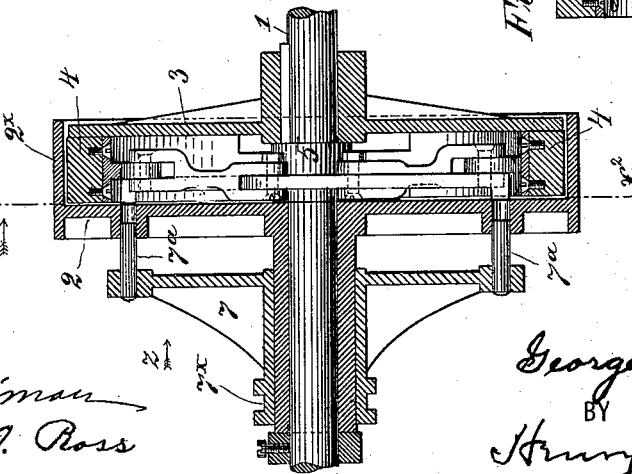
WITNESSES:  INVENTOR
George R. Clarke,
BY
ATTORNEY
THE NORRIS PETERS CO., PHOTO-LITHO., WASHINGTON, D. C.

No. 614,699. Patented Nov. 22, 1898.
G. R. CLARKE.
FRICTION CLUTCH.
(Application filed Mar. 18, 1898.)
(No Model.) 2 Sheets—Sheet 2.
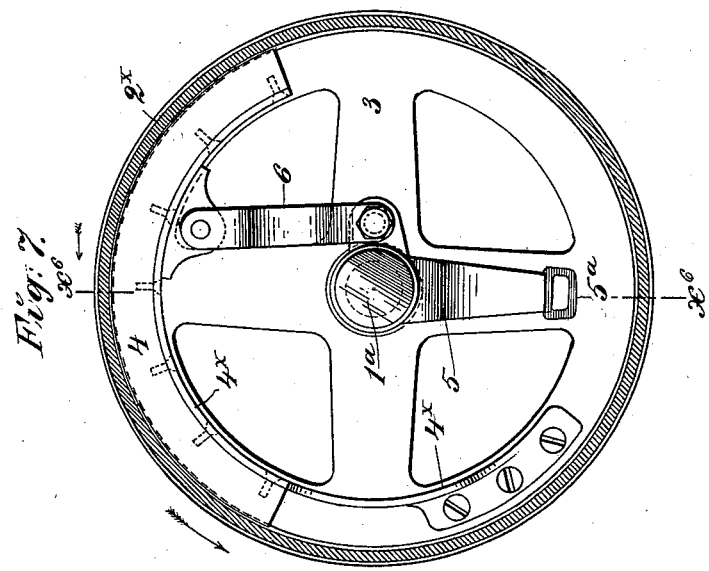
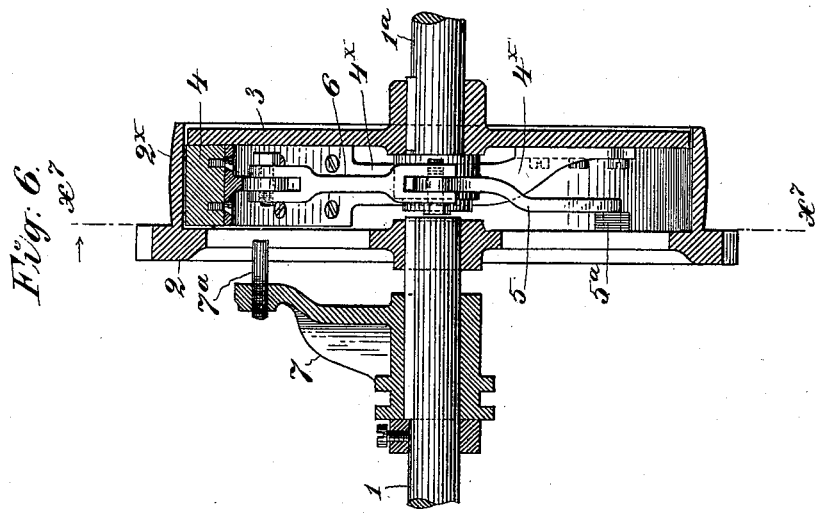
WITNESSES:
J. H. Wiman
Peter N. Ross.
INVENTOR
George R. Clarke,
BY
Henry Connett
ATTORNEY

UNITED STATES PATENT OFFICE.

GEORGE R. CLARKE, OF MONTELL, TEXAS.

FRICTION-CLUTCH.

SPECIFICATION forming part of Letters Patent No. 614,699, dated November 22, 1898.

Application filed March 18, 1898. Serial No. 674,291. (No model.)

*To all whom it may concern:*

Be it known that I, GEORGE R. CLARKE, a citizen of the United States, residing in Montell, in the county of Uvalde and State of Texas, have invented certain new and useful Improvements in Friction-Clutches, of which the following is a specification.

My invention relates to the general class of friction-clutches wherein a shoe carried by one member is pressed into frictional contact with a rim on the other member; and the object of the invention is, in the main, to so construct a clutch of the above character that the only duty required from the attendant is to shift the clutch, the driving friction being then effected wholly by the resistance to rotation of the part driven, the friction increasing with the resistance. The clutch has thus all of the advantages of facility in shifting that pertains to the interlocking-clutch, coupled with the ordinary advantages due to the friction-clutch and the additional advantage of the automatic regulation of the friction to adapt it to the work.

As in most clutches, it is not material which member of my clutch is the driver. It may be adapted for clutching a rotating loose pulley or gear-wheel to the counter-shaft or arbor on which the latter is mounted, to clutch a rotating shaft to a loose pulley or gear-wheel thereon, or to clutch a rotating shaft to another shaft alined with it end to end.

I have herein illustrated an embodiment of my friction-clutch wherein the clutch-rim of one member forms a part of an ordinary loose pulley on a shaft on which the other member is fixed or keyed.

In the accompanying drawings, Figure 1 is a diametrical section in the plane of the line $x'\,x'$ in Fig. 2, some of the mechanism within the clutch-rim being in elevation. Fig. 2 is a section in the plane of the line $x^2\,x^2$ in Fig. 1. Fig. 3 is a view from the point indicated by arrow $z$ in Fig. 1, showing the detent-carrier. Fig. 4 is a section substantially on the broken line $x^4\,x^4$ in Fig. 2, showing how the clutch-shoe is hinged to the carrier. Fig. 5 is a side view of the clutch-shoe detached. Figs. 6 and 7 are views corresponding to Figs. 1 and 2, respectively, and illustrating certain modifications. Fig. 6 is a section on line $x^6\,x^6$ in Fig. 7, and Fig. 7 is a section on line $x^7\,x^7$ in Fig. 6.

1 represents a shaft, which may be an arbor or shaft of a machine, and 2 a pulley or rotatable driver mounted to rotate freely or loosely thereon. This pulley has a laterally-projecting clutch-rim $2^\times$, within which is situated the other clutch member.

Keyed or fixed on the shaft 1 is a carrier 3, which I prefer to make in the form of a disk, and to the inner face of this carrier are pivoted or hinged the shoes 4, preferably two, of nearly semicircular form, as shown in Fig. 5, which represents one of the shoes detached. The body of the shoe may be of wood bent or cut to the proper curved shape to fit the inner face of the clutch-rim and be secured to a metal arm or support $4^\times$, having in its extremity an eye to receive a hinge-pin $4^a$, Fig. 4, which screws into the carrier 3 and forms a pivot-point about which the shoe turns in moving up to and away from the clutch-rim. Mounted loosely on the shaft 1, between the web of the pulley and the carrier 3, is a double or two-armed toggle-lever 5, and this lever is connected to the respective shoes 4 toward their free ends by toggle-links 6 6. Each link 6 is coupled at its outer end to the arm $4^\times$ of the shoe and at its inner end to a lug on the boss of the lever 5, as clearly shown, whereby when said lever is turned about its bearing on the shaft in one direction (toward the right in Fig. 2) the toggle will tend to straighten and force the shoe 4 out against the inner face of the clutch-rim.

On the boss of the pulley 2, which, as herein shown, projects from the plane of the web in a direction opposite to the clutch-flange $2^\times$, is mounted a sliding detent-carrier 7, having in it the usual circumferential groove $7^\times$ to receive a shifting-fork. This carrier 7 has a limited sliding movement on the pulley-boss or on the shaft 1, as the case may be, and in it are fixed two detent-pins $7^a$, which play through holes in the web of the pulley or wheel 2. By shifting the carrier 7 up to the pulley the detent-pins will be protruded into the plane of the respective arms of the toggle-lever 5, when by the rotation of the pulley said pins will engage the lever 5 and tend to straighten the toggles, thus forcing the shoes 4 outward and into contact with the clutch-rim $2^\times$. Thus it will be seen that the frictional pressure of the shoes on the clutch-rim will be automatically regulated by the resistance offered by the load on the shaft, as the greater the resistance offered the greater will be the force tending to press the shoes into contact with the rim. The pulley is supposed to be rotating in the direction indicated by the arrow $z'$ in Fig. 2.

If the shaft be the driver and the wheel or pulley loose thereon is to be driven through the clutch, the operation will be precisely the same. In such a case the resistance offered by the detent-pins to the rotation of the toggle-lever with the shaft will set the clutch-shoes, as before described. In either case if the load be increased the pressure of the shoes on the pulley-rim will be proportionately increased, as the slightest slip of the shoes will bring the toggle-lever up forcibly against the detent-pins, thus causing an increase of the frictional pressure of the shoes.

In order to balance the structure, I have shown in Figs. 1, 2, and 3 two oppositely-arranged shoes 4, two toggle-links 6, a toggle-lever 5, with two arms, and two detent-pins to engage the respective arms of the lever; but it will be obvious to any one skilled in the art that the invention might be carried out with one or more of each of these coöperating parts or elements—that is to say, an operative clutch could be produced with one shoe 4, one link 6, a toggle-lever 5 with one arm, and one detent-pin to engage said arm.

The pulley 2 or corresponding part forms a part or member of the clutch. Of course so long as this part 2 has a clutch-rim for the shoes 4 to bear upon it is not material whether it be technically a pulley or not. It might be a toothed wheel, for example, or any rotating driver.

To avoid noise when the detent-pins $7^a$ engage the arms of the toggle-lever 5, the latter may be provided with pads $5^a$, of leather or other suitable material.

In Figs. 6 and 7 I have shown certain modifications of the construction illustrated in the principal views hereinbefore described. In this construction two shafts 1 and $1^a$ are placed end to end, the latter, bearing the carrier 3, being intended to drive the former. The wheel 2, which is provided with the clutch-rim $2^\times$, is a toothed wheel and is keyed on the shaft 1. There is but one clutch-shoe 4 and one toggle-link 6, and the toggle-lever 5 has but one arm. The detent-carrier 7 is in this instance mounted on and splined on the shaft 1.

Where the shaft bearing the carrier 3 and shoes 4 is the driver, I prefer to employ a spring to resist the centrifugal force tending to move the shoe or shoes outward into contact with the rim. In Fig. 7 a simple form of spring is shown. The arm or support $4^\times$ is made of steel and prolonged, being fixed to the carrier 3 rigidly at its extremity. Normally this spring holds the shoe well out of contact with the rim, and it is stiff enough to resist the centrifugal force, but when the toggle is applied it will yield and allow the shoe to press on the rim.

Having thus described my invention, I claim—

1. A friction-clutch comprising a shoe-carrier, adapted to be fixedly mounted on a shaft, a movable clutch-shoe carried thereby, a toggle-lever adapted to be loosely mounted on the same shaft with the shoe-carrier, a toggle-link coupled at one end to the shoe and at the other end to the toggle-lever, whereby movement of the latter about its bearing in one direction tends to straighten the toggle and set the shoe on an inclosing clutch-rim, a wheel adapted to be mounted on the shaft and provided with said clutch-rim, and a movable detent carried by said wheel and adapted to act on the arm of said toggle-lever to set the shoe, substantially as set forth.

2. The combination with a shaft, and a wheel mounted rotatively on said shaft and provided with a clutch-rim for the clutch-shoe to impinge upon, of a shoe-carrier secured to the shaft adjacent to said rim, a clutch-shoe hinged to said carrier and adapted to be moved into and out of frictional contact with said rim, a toggle-lever, mounted loosely on the shaft, a toggle-link coupled at one end to the clutch-shoe and at the other end to the said toggle-lever, a shiftable detent-carrier mounted on the boss of said pulley, and detent-pins fixed in said carrier and adapted to be protruded into engagement with said toggle-lever, substantially as set forth.

3. The combination with a shaft, of a friction-clutch comprising as one member, a shoe-carrier fixed on the shaft, a clutch-shoe hinged to said carrier, a toggle-lever mounted loosely on said shaft adjacent to said carrier, and a link coupled at one end to the shoe and at the other end to the toggle-lever, and comprising as the other member, a wheel mounted loosely on the shaft and provided with a clutch-rim embracing said shoe, and a movable detent, carried by said wheel and adapted to be put into engagement with the arm of said toggle-lever for setting the clutch, substantially as set forth.

4. In a friction-clutch, the combination with the carrier 3, adapted to be fixed on a shaft, the clutch-shoes 4, provided each with a supporting-arm $4^\times$, hinged at its extremity to the face of the carrier 3, a two-armed toggle-lever 5, adapted to be mounted loosely on the same shaft with the carrier, and the two toggle-links 6, coupled at their outer ends to the free ends of the respective clutch-shoes and at their inner ends to the boss of the toggle-lever, of a wheel having a clutch-rim which embraces said shoes and shiftable detent-pins carried by said wheel and adapted to be moved into engagement with the respective arms of the toggle-lever, substantially as and for the purpose set forth.

In witness whereof I have hereunto signed my name, this 7th day of March, 1898, in the presence of two subscribing witnesses.

GEORGE R. CLARKE.

Witnesses:
W. H. CLARKE,
A. G. CODNER.